March 12, 1957 G. HERR 2,784,770
ADJUSTABLE BACKREST MECHANISM
Filed March 15, 1954 2 Sheets-Sheet 2
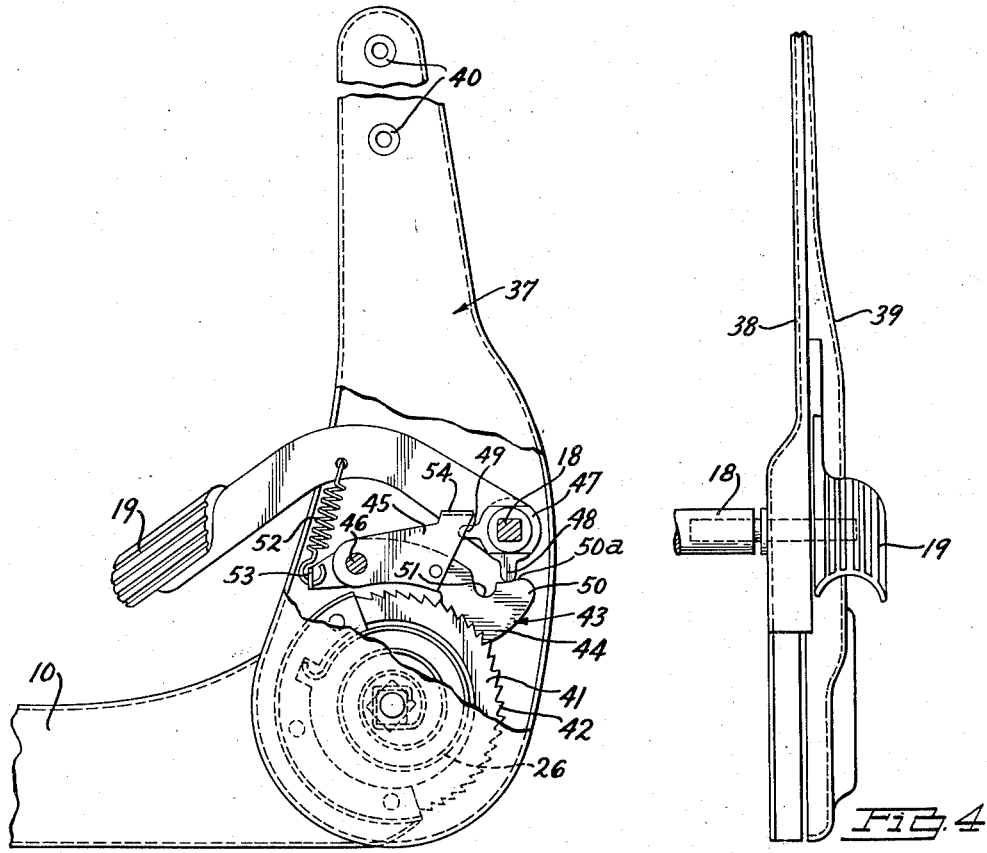
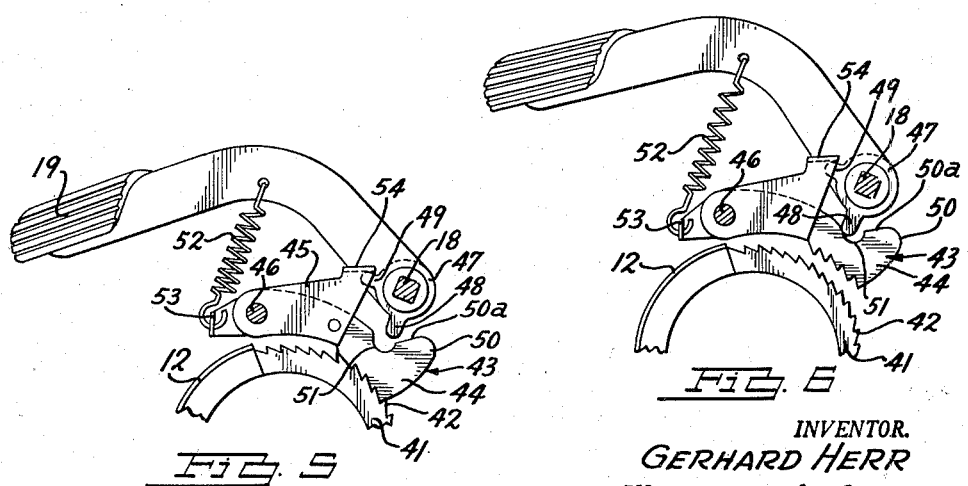
INVENTOR.
GERHARD HERR
BY John Joseph Roethel
ATTORNEY

United States Patent Office 2,784,770
Patented Mar. 12, 1957

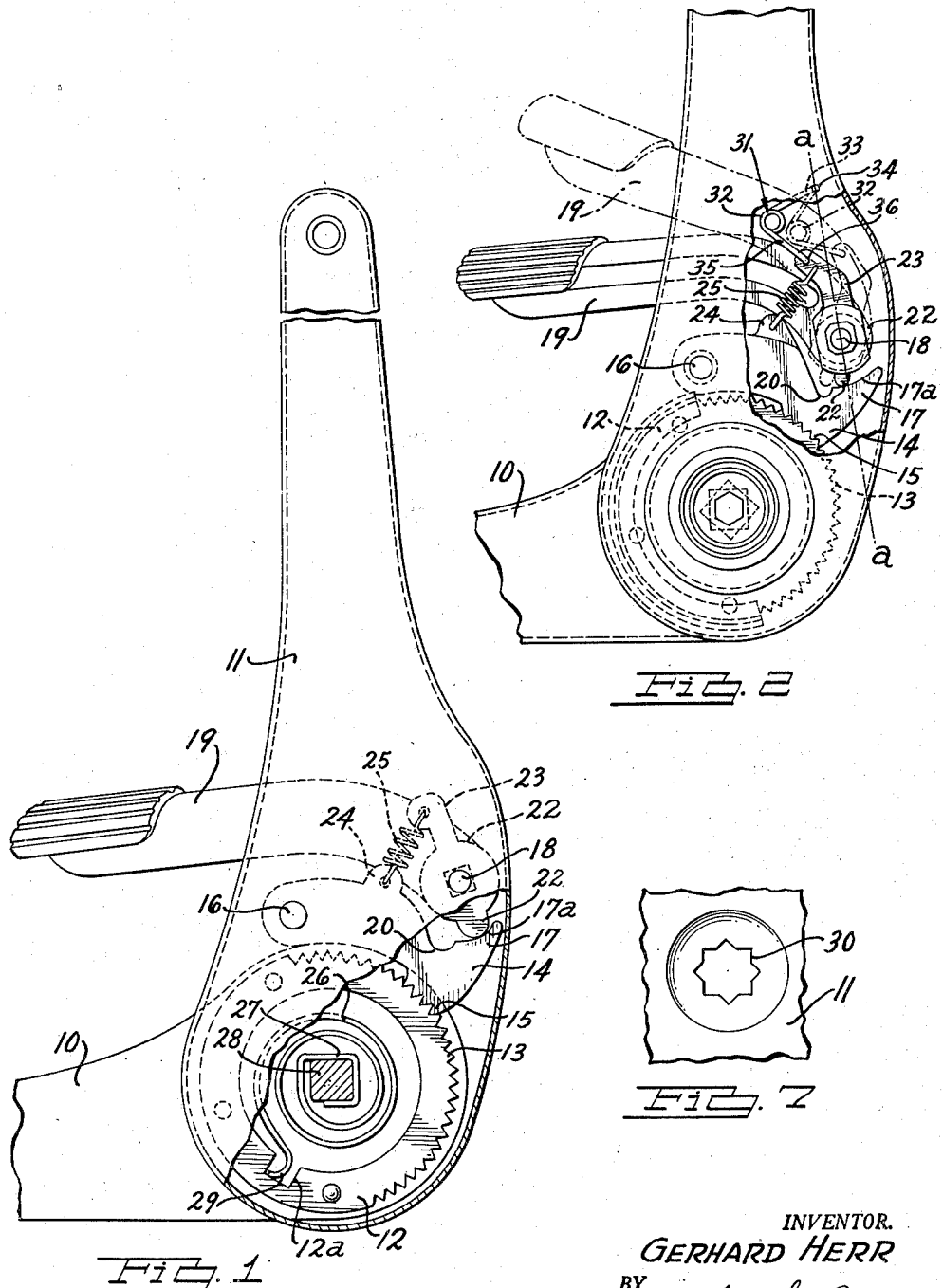

2,784,770

ADJUSTABLE BACKREST MECHANISM

Gerhard Herr, Northrhine-Westphalia, Germany, assignor to Gebruder Happich-Gesellschaft mit beschränkter Haftung, Wuppertal-Elberfeld, Germany Application March 15, 1954, Serial No. 416,328

Claims priority, application Germany March 16, 1953

9 Claims. (Cl. 155—160)

This invention relates to a seat backrest mechanism which permits the backrest to be selectively positioned in a tilted or angular position, and which is particularly adapted for use in reclining seats in automobiles or other vehicles. An object of the present invention is to provide an improved mechanism which permits easy adjustment of the backrest in its desired angular position and which firmly holds said backrest in such position, which mechanism is characterized by its simplicity and compactness in construction and which is relatively small in size, economical to manufacture, comparatively quiet in operation and efficient in use.

One form of backrest adjustment and locking mechanism which has found commercial acceptance is a mechanism in which a gear segment is fixed to the fixed seat frame member and a toothed pawl is operatively mounted on the swingable back rest. To hold the backrest at a given angle, the pawl is ordinarily held in contact with the gear segment by a spring. To permit adjustability of the back rest in small degrees, the gear segment teeth are small sharp teeth. Likewise, the circular pitch of the pawl is kept small so that the teeth are rather sharp on their tops. However, when a large force is exerted against the back rest, the pawl teeth will tend to climb out of mesh with the segment teeth and the spring will yieldingly permit this to occur. Thus, the blocking of movement of the back rest is not as firm as desired. This may be overcome by increasing the strength of the spring but then greater lifting force must be exerted on the pawl when it is desired to intentionally disengage it from the gear segment to permit angular adjustment of the back rest.

As an alternative to increasing the strength of the spring the size of the teeth may be increased, that is, broad trapezoidally formed teeth may be used. However, the use of such a larger tooth form has the disadvantage that the teeth on the pawl and the teeth on the gear segment will sometimes ride on top of each other rather than fully meshing, thus failing to lock the back rest in its desired position of adjustment.

The present invention has as its basic object the provision of an improved means for preventing an undesired change in the angular adjustment of the back rest once the same has been locked in position, the improved means permtting the use of a sharp tooth form on the pawl and the gear segment. The improved means embodies a locking cam movable in response to a locking mechanism actuator handle, the cam being effective to mechanically lock the pawl in mesh with the gear segment thus preventing disengagement of the pawl from the gear segment without operation of the actuator handle. The cam is constructed and positioned relative to the pawl in such a manner that any force exerted on the back rest only tends to increase the camming action and thus urges the pawl into tighter engagement with the gear segment. The pawl, however, is provided with a groove or recess adjacent the point of contact of the cam into which the cam will enter, thus releasing the pressure on the pawl, when the actuator handle is operated to release the locking mechanism to permit angular adjustment of the back rest. In one embodiment of the invention upon such movement of the cam into the groove, the pawl is then free to be lifted out of engagement with the gear segment by a spring means provided for that purpose. In another embodiment, operation of the actuator handle, one part of the cam releases the pawl while a second part of the cam, upon further movement thereof, lifts the pawl out of engagement with the gear segment.

Other objects and features of the particular embodiments of the invention herein illustrated will appear in the following description, reference being had to the accompanying drawings forming a part of this specification wherein like reference numerals designate corresponding parts in the several views.

Fig. 1 is a front elevation of the back rest adjusting and locking mechanism and illustrating one embodiment of the present invention.

Fig. 2 is a view in part similar to Fig. 1 illustrating a second embodiment of the present invention.

Fig. 3 is a view in part similar to Fig. 1 illustrating yet another embodiment of the present invention.

Fig. 4 is a side elevation of Fig. 3.

Fig. 5 is a view in part similar to Fig. 3 showing the parts of the mechanism in an intermediate position of operation as compared to Fig. 3 wherein the actuator handle is in its lowermost position.

Fig. 6 is a view in part similar to Fig. 3 showing the mechanism in completely disengaged position as compared to Fig. 3 wherein the mechanism was in fully locked position and as compared to Fig. 5 wherein the mechanism was in partially disengaged position.

Fig. 7 is a view of a detail of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The seat adjustment and locking device illustrated in the embodiment of the invention illustrated in Fig. 1 comprises a horizontal frame member 10 which is adapted to be a part of or attached to the frame of the seat. Pivotally mounted thereon is a frame member 11 shown in substantially vertical relationship to the frame member 10. The frame member 11 forms a part of or is adapted to be secured to a framework forming a part of the seat back rest.

The frame member 10 has rigidly secured thereto a ring element 12 having a gear segment 13 formed thereon. Coacting with the gear segment 13 is a pawl 14 having a toothed portion 15 thereon, the pawl 14 being pivotally mounted at 16 to the swingable frame member 11.

The pawl 14 is provided at its upper edge with a curved portion 17, the curved surface 17a being a segment of an arc of a circle whose center is at the axis of a shaft 18. The shaft 18 is the pivotal mounting of an actuator handle 19. Immediately adjacent the curved surface 17a of the pawl, there is provided a groove 20. The groove 20 is adapted to receive a cam projection 21 on a cam member 22, the cam member 22 being connected to said handle 19 in any convenient manner for movement therewith, as will be more fully explained. The cam member 22 is provided with an extension 23 substantially diametrically opposed to the cam projection 21. Projecting between the extension 23 and a part 24 of the pawl 14 is a coil spring 25.

The foregoing described structure operates as follows: To swing the back rest backwards, i. e., in clockwise directions as viewed in Fig. 1, it is necessary to lift upwardly on the handle 19. In so doing the cam projection 21 will be moved along the curved surface 17a of the portion 17 of the pawl. As the handle 19 and cam member 22 travel in a clockwise direction the spring 25 will be placed under increased tension. Upon the cam projection 21 reaching the groove 20 in the pawl 14, the spring 25 will pull the pawl sharply upwardly disengaging the toothed portion 15 from the gear segment 13, thus releasing the frame member 11 for movement in a backward or clockwise direction. Downward pressure on the handle 19, when the desired position of angular adjustment of the backrest has been reached, will cause the pawl teeth to engage the gear segment thus locking the back rest in fixed position.

A counterbalance spring 26 is provided to aid in the restoration of the back rest to an upright position. The spring 26 comprises a flat spiral spring which at its inner end 27 embraces a square shaft element 28 which is adapted to be immovably held relative to the swingable frame member 11. The other or outer end 29 of the spiral spring 26 is hooked into a notch 12a in the gear segment ring 12. It will be apparent that when the frame element 11 is swung in a clockwise direction the counterbalance spring 26 will be placed under increased tension. Thus, when it is desired to permit the frame element 11 to raise upwardly, the spring 26 will tend to become unwound thus causing such upward movement.

It will be understood that the mechanism described herein may be duplicated on each side of the backrest, that is, at least the frame members 10 and 11 and the spiral counterbalance spring 26. The square shaft element 28 preferably extends across the backrest and is common to both frame members 11. The ends of the shaft 28 preferably are received in an aperture 30, illustrated in Fig. 7, which is actually a hexagonal polygon formed by superimposing one square upon a second but transposed 45°. This arrangement permits at the least eight locking positionings of the shaft element 28 relative to the frame members 11 which may be utilized to set the initial load on the counterbalance springs 26.

The present embodiment thus provides a positive means for holding the pawl 14 in engagement with the gear segment 13. Any pressure exerted on the backrest which would tend to move the frame member 12 in a clockwise direction only results in the cam member 22 exerting increased locking pressure on the pawl 14. Thus, the backrest is safely held in its selected position of adjustment until the handle 19 is lifted thereby disengaging the pawl 14 from the gear segment.

The embodiment of the invention illustrated in Fig. 2 is substantially similar to that of Fig. 1 differing therefrom in the provision of an additional spring means, generally designated 31. The object of the additional spring means 31 is to ensure that the cam member 22 when moved by the actuating handle 19 moves completely to a pawl engaging position or a pawl disengaging position. That is, when the cam member 22 is moved past a dead center position in either engaging or disengaging direction, the movement will be a complete one. Or, conversely, if the actuating handle is accidentally partially moved the provided spring means 31 will restore the parts to their completely engaged or disengaged condition.

In the present embodiment, as well as the embodiment of Fig. 1, the actuating handle is adapted to be in either one of two end positions. In one position of the actuating handle the cam member 22 is in position to maintain the pawl 14 in engagement with the gear segment 13; in the second position of the handle, the cam member 22 is ineffective to hold the pawl 14 in such engagement. In the present embodiment, should the actuating handle 19 in the one position or the other be inadvertently lifted up or pressed down, it is the function of the additional spring to provide for the automatic re-adjustment of the handle to the position from which it was inadvertently moved. Not until a sufficient and deliberate amount of pressure or pull is exerted on the handle will the spring means be pulled over its dead center position. This necessary pressure or pull is so calculated that more than an inadvertent movement of the actuating handle is required. The handle must be intentionally shifted in order that it will snap over from one position to the other. The snapping effect gives to the driver the safe feeling of a correctly arranged adjustment.

As illustrated in Fig. 2 the spring means 31 comprises a toggle spring 32 having one end 33 thereof hooked into an aperture 34 in the frame member 11 and the other end 35 thereof hooked into an aperture 36 in the cam member extension 23.

To illustrate the action of this toggle spring 32, a line a—a has been drawn through the center of the aperture 34 and the axis of shaft 18, the line a—a representing the locus of the dead center position of the toggle spring 32. It will be assumed that the desired movement of the actuating handle 19 is to result in disengagement of the pawl 14. When the lower end 35 of the spring 32 reaches the line a—a upon movement of the actuating handle 19 in a clockwise direction, as viewed in Fig. 2, the spring 32 is at its highest tension, i. e., the spring is at its dead center position. As soon as the dead center position is passed the spring 32 exerts a force in a direction to complete the initial movement, that is, to move the cam member 22 from the solid line position in Fig. 2 to the dotted line position in which the cam projection 21 is in alignment with the notch or groove 20 thereby permitting the spring 25 to lift the pawl 14 out of engagement with the gear segment 13. From the initial position to the dead center position the toggle spring actually resists movement of the actuating handle 19 and the cam member 22. But once the dead center position is passed, the handle 19 will snap into its uppermost position and remain there. To restore the mechanism to pawl engaged position it again is necessary to overcome the resistance of the toggle spring 32 until its dead center position is passed, at which time the handle 19 and cam member 22 will be sharply snapped into the solid line position shown in Fig. 2.

It will be understood that when the pawl 14 is in the disengaged position the counterbalance spring 26 described with reference to Fig. 1 is effective to keep the backrest from falling to a fully reclined position. Manual pressure must be exerted to get the desired angle of inclination even with the pawl 14 disengaged from the gear segment 13.

In the embodiment of the invention illustrated in Figs. 1 and 2 the actuating handle was intended to be in one of two positions, that is, in one position in which the pawl 14 was locked in engagement with the gear segment 13 or in a second position in which the pawl 14 was disengaged from the gear segment 13. It is an object of the embodiment of the invention illustrated in Figs. 3 to 6 inclusive to provide an intermediate functional position of the handle. In the intermediate position the handle is given the task of releasing the backrest mechanism to permit the backrest to be eased into a more upright position. However, when the handle is in such intermediate position, the mechanism is not released to the extent that the backrest is freely movable into a further reclined position. The construction and arrangement of the present embodiment provides a mechanism in which it is not necessary to completely lift the actuating handle when it is desired to ease the backrest into a slightly more upright position.

In the present embodiment the pivoted frame member 37 corresponding to the frame member 11 of the previously described embodiments, comprises two shell members 38 and 39 respectively which are connected by suitable rivet means 40, preferably hollow rivets adapted to receive screw means for fastening the shells 38 and 39 together.

The present embodiment is provided with a gear segment 41 which differs from the gear segment 13 of the previous embodiments in that the teeth 42 thereof are in the form of ratchet teeth. A pawl means 43 comprising a double armed lever having arms 44 and 45 coacts with the gear segment. The pawl means arms 44 and 45 are riveted together and pivoted about the axis of pivot stud 46.

The actuating handle pivot shaft 18 has mounted thereon a cam disk or member 47 having two cam projections 48 and 49. The cam projection 48 functions in the same manner as the projection 21 of the embodiments of Figs. 1 and 2. When in engagement with the curved surface 50a of the portion 50 of the pawl arm 44, the projection 47 is adapted to lock the pawl means 43 in mesh with the gear segment 41. When the cam projection 48 is in alignment with the notch or groove 51 of the pawl arm 44, the pawl arm 44 may then be lifted out of engagement with the gear segment 41.

In the present embodiment a coil spring 52 is provided which works oppositely to the coil spring 25 of the previous embodiments. The coil spring 52 is attached at one end thereof to actuating handle 19 and at the other end to an extension 53 of the pawl means arm 44. Whereas in the previous embodiments the coil spring would tend to lift the pawl means out of engagement with the gear segment, the coil spring 52 tends to urge the pawl arm 44 into engagement with the gear segment 41. As the handle 19 is lifted higher the tension on the spring 52 is increased thereby tending to urge the pawl means 43 into tighter engagement with gear segment. However, the second pawl means arm 45 is provided with a flange 54 overlying the path of movement of the cam disk projection 49. As shown in Fig. 6, when the cam disk projection 48 is in alignment with the notch 51 the projection 49 thereon exerts a lifting action on the flange 54 thereby lifting the pawl means 43 out of engagement with the gear segment 41 despite the resistance of the spring 52.

The operation of the present embodiment is as follows: To adjust the vehicle seat backrest from an upright position to a more reclined position, the seat operator will normally grasp the actuating handle 19 and lift the same from the position shown in Fig. 3 to the position shown in Fig. 6. The blocking effect of the cam projection 48 is removed and the pawl means 43 is lifted from the gear segment 41 in opposition to the resistance of the spring 52. With the mechanism parts in the position shown in Fig. 6, the seat backrest is freely movable in either direction. It may, for example, be moved to a completely reclining position or it may be permitted to be restored to a completely upright position under the effect of the counterbalance spring 26.

Normally as soon as the approximate desired reclined position of the backrest is reached, the user of the vehicle seat will release the actuating handle 19 which will then assume a position approximating that shown in Fig. 5. The pawl means teeth will be in engagement with gear segment 41 but the cam projection 48 will not be exerting any locking pressure on the pawl means 43. In this condition no further reclining movement of the backrest can occur. However, if it is desired to permit the backrest to assume a more upright position, it is only necessary to permit the counterbalance spring 26 to urge the backrest upwardly since the pawl means teeth will glide over the ratchet-like teeth of the gear segment 41. When the definitely desired position of the backrest is reached, the user of the seat need then only press the handle 19 completely down and the pawl means will be locked by the cam disk projection 48 against disengagement from the gear segment 41. Movement of the backrest in either direction will then be completely prevented.

In the event that the backrest is in an inclined position and it is desired to permit it to assume a more upright position, it is only necessary to release the actuating handle 19 from the position shown in Fig. 3 to the position shown in Fig. 5. Then, as explained above, the counterbalance spring 26 will be effective to move the backrest upwardly to any desired position in which it may be locked against further movement by depressing the actuating handle 19 to the position shown in Fig. 3.

As will be noticed, the entire mechanism of the present embodiment, with the exception of part of the actuating handle 19 is concealed within the backrest frame member shells 38 and 39 respectively.

I claim:

1. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, and locking means, said locking means including a cam means and an actuating member for selectively moving said cam means into and out of abutting relation to said pawl means, said cam means and actuating member being pivotally mounted on said swingable frame member, said cam means when in abutting relation to said pawl means locking the same in engagement with said toothed member.

2. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, and locking means, said locking means including a cam means and an actuating lever for selectively moving said cam means into and out of abutting relation to said pawl means, said cam means and actuating lever being pivotally mounted on said swingable frame member for movement about a common pivot axis, said cam means when in abutting relation to said pawl means locking the same in engagement with said toothed member.

3. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, locking means, said locking means including a cam means and an actuating means for selectively moving said cam means into and out of abutting relation to said pawl means, said cam means and actuating means being pivotally mounted on said swingable frame member, said cam means when in abutting relation to said pawl means locking the same in engagement with said toothed member, and spring means interposed between said actuating means and said pawl means, said actuating means upon actuation thereof to move said cam means out of abutting relation to said pawl means being effective to place said spring means under tension whereby the latter will lift said pawl means out of engagement with said toothed member to permit swinging movement of said swingable frame member.

4. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, locking means, said locking means including a cam means and an actuating means for selectively moving said cam means into and out of abutting relation to said pawl means, said actuating means including an actuating lever, said cam means and actuating lever being pivotally mounted on said swingable frame member for movement about a common pivot axis, said cam means when in abutting relation to said pawl means locking the same in engagement with said toothed member, and spring means interposed between said actuating means and said pawl means, said actuating means upon actuation thereof to move said cam means out of abutting relation to said pawl means being effective to place said spring means under tension whereby the latter will lift said pawl means up out of engagement with said toothed member to permit swinging movement of said swingable frame member.

5. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, locking means, said locking means including a cam means and an actuating means, said cam means and actuating means being pivotally mounted on sid swingable frame member for movement about a common pivot axis, said cam means being movable in one direction by said actuating means into abutting relation to said pawl means to lock said pawl means in engagement with said toothed member, said cam means being movable in the opposite direction by said actuating means out of abutting relation to said pawl means, and means responsive to movement of said actuating means to move said pawl means out of engagement with said toothed member when said cam means is out of abutting relation thereto whereby said frame members may be angularly adjusted relatively to one another.

6. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, locking means, said locking means including a cam means and an actuating member, said cam means and actuating member being pivotally mounted on said swingable frame member for movement about a common pivot axis, said cam means being movable in one direction by said actuating member into abutting relation to said pawl means to lock said pawl means in engagement with said toothed member, said cam means being movable in the opposite direction by said actuating member out of abutting relation to said pawl means and being further movable in said opposite direction to cause a part thereof to engage said pawl means to lift the same out of engagement with said toothed member thereby to permit angular adjustment of said frame members.

7. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, locking means, said locking means including a cam means and an actuating member, said cam means and actuating member being pivotally mounted on said swingable frame member for movement about a common pivot axis, said cam means being movable in one direction by said actuating member into abutting relation to said pawl means to lock said pawl means in engagement with said toothed member, said cam means being movable in the opposite direction by said actuating member out of abutting relation to said pawl means and being further movable in said opposite direction to cause a part thereof to engage said pawl means to lift the same out of engagement with said toothed member thereby to permit angular adjustment of said frame members, and spring means interposed between said actuating member and said pawl means effective to hold the latter in engagement with said toothed member until said cam means engages said pawl means to lift the same.

8. Seat backrest adjusting mechanism comprising a fixed frame member and a swingable frame member, a toothed member immovably secured to said fixed frame member, a pawl means pivotally mounted on said swingable frame member, said pawl means being engageable with said toothed member to maintain said swingable frame member in selective angular relationship to said fixed frame member, locking means, said locking means including a cam means and an actuating means, said cam means and actuating means being pivotally mounted on said swingable frame member for movement about a common pivot axis, said cam means being movable in one direction by said actuating means into abutting relation to said pawl means to lock said pawl means in engagement with said toothed member, said cam means being movable in the opposite direction by said actuating means out of abutting relation to said pawl means whereby the latter may be disengaged from said toothed member to permit angular adjustment of said frame members, and spring means disposed to urge said cam means in either pawl abutting or pawl non-abutting direction after movement by said actuating member past a dead center position.

9. Seat backrest adjusting mechanism comprising a fixed frame member and a swingable frame member, a toothed member immovably secured to said fixed frame member, pawl means pivotally mounted on said swingable frame member, said pawl means being engageable with said toothed member to maintain said swingable frame member in selective angular relationship to said fixed frame member, locking means, said locking means including a cam means and an actuating means, said cam means and actuating means being pivotally mounted on said swingable frame member for movement about a common pivot axis, said cam means being movable in one direction by said actuating means into abutting relation to said pawl means to lock said pawl means in engagement with said toothed member, said cam means being movable in the opposite direction by said actuating means out of abutting relation to said pawl means whereby the latter may be disengaged from said toothed member to permit angular adjustment of said frame members, spring means interposed between said actuating means and said pawl means, said actuating means upon actuation thereof to move said cam means out of abutting relation to said pawl means being effective to place said spring means under tension whereby the latter will lift said pawl means up out of engagement with said toothed member to permit swinging movement of said swingable frame member, and spring means disposed to urge said cam means in either pawl abutting or pawl non-abutting direction after movement by said actuating member past a dead center position.

References Cited in the file of this patent

UNITED STATES PATENTS

| | | |
|---|---|---|
| 1,182,707 | Quade | May 9, 1916 |
| 1,255,563 | Ostendorf | Feb. 5, 1918 |
| 1,341,504 | Grupe et al. | May 25, 1920 |
| 2,266,994 | Saunders | Dec. 23, 1941 |
| 2,311,105 | Will | Feb. 16, 1943 |
| 2,564,762 | Howard | Aug. 24, 1945 |

FOREIGN PATENTS

| | | |
|---|---|---|
| 365,307 | Italy | Nov. 30, 1938 |
| 622,139 | Great Britain | Apr. 27, 1949 |
| 881,099 | Germany | June 29, 1953 |